US007690913B2

(12) United States Patent
Son

(10) Patent No.: US 7,690,913 B2
(45) Date of Patent: Apr. 6, 2010

(54) EMBOSSING APPARATUS AND METHOD

(75) Inventor: Hyoung-Kyu Son, Sungnam (KR)

(73) Assignee: Advanced Display Process Engineering Co., Ltd., Sungnam-shi, Kyunggi-do (KR)

( * ) Notice: Subject to any disclaimer, the term of this patent is extended or adjusted under 35 U.S.C. 154(b) by 222 days.

(21) Appl. No.: 11/748,542

(22) Filed: May 15, 2007

(65) Prior Publication Data

US 2007/0266867 A1 Nov. 22, 2007

(30) Foreign Application Priority Data

May 19, 2006 (KR) ...................... 10-2006-0045146

(51) Int. Cl.
*A01J 21/00* (2006.01)

(52) U.S. Cl. ....................... 425/449; 425/447; 425/128; 101/3.1

(58) Field of Classification Search ................. 425/358, 425/127, 128, 125, 449, 447; 264/135, 119; 101/3.1
See application file for complete search history.

(56) References Cited

U.S. PATENT DOCUMENTS 405,721 A * 6/1889 Smith ......................... 425/449
3,526,694 A * 9/1970 Lemelson ................... 264/259
5,089,314 A * 2/1992 Masujima et al. ........... 428/156

FOREIGN PATENT DOCUMENTS

JP 2000-021962 1/2000

* cited by examiner

*Primary Examiner*—Eric Hug
*Assistant Examiner*—Jacob Thomas Minskey
(74) *Attorney, Agent, or Firm*—KED & Associates LLP

(57) ABSTRACT

An apparatus is provided that forms embossed portions on a workpiece. The apparatus includes a melting chamber filled with melt, such as ceramic, nozzles provided at a lower portion of the melting chamber, and presses provided adjacent to each of the injection nozzles. The injection nozzles drop the melt on the workpiece and the presses press the dropped melt into a predetermined shape of the embossed portions in a state where the dropped melt is being solidified after being dropped on the workpiece.

18 Claims, 5 Drawing Sheets

EMBOSSING APPARATUS AND METHOD

BACKGROUND OF THE INVENTION

1. Field of the Invention

The present invention relates to an embossing apparatus and method, and more particularly, to an embossing apparatus and method capable of forming an embossed portion by dropping melt and solidifying and pressing it into a predetermined shape.

2. Description of the Related Art

In order to treat a substrate in a process of manufacturing a semiconductor or a flat display panel, a substrate support for supporting a substrate or an electrostatic chuck for fixing a substrate using electrostatic force is inevitably used.

Embossed portions are provided at certain intervals on an upper surface of the substrate support or the electrostatic chuck in order to minimize the contact surface with the substrate.

Conventional methods for forming the embossed portions are shown in FIGS. 1*a* and 1*b*.

As shown in FIG. 1*a*, a mask M having a plurality of holes formed therein is located over an upper insulation layer 24 which is the uppermost insulation layer of an electrostatic chuck, and melt is sprayed to form embossed portions.

However, in this case, the precision of the embossed portions E lowers and the shape thereof is irregular, whereby there is a problem in that the method is inappropriate to mass-production.

Further, as shown in FIG. 1*b*, an upper insulation layer 24, which is the uppermost insulation layer of an electrostatic chuck and has the thickness including the height of embossed portions E, is machined by a tool T to form the embossed portions E.

However, since the embossed portions E are machined, the embossed portions E are weak and the machining cost and time is increased. Further, as the preciseness of the embossed portions E is required, there is a problem in that an additional post-process is performed.

SUMMARY OF THE INVENTION

The present invention is conceived to solve the aforementioned problems in the prior art. An object of the present invention is to provide an embossing apparatus and method capable of forming an embossed portion by dropping melt and solidifying and pressing it into a predetermined shape.

According to an aspect of the present invention for achieving the object, there is provided an apparatus for forming an embossed portion on a workpiece comprises a melting chamber filled with melt, such as ceramic, to be a material of the embossed portion; an injection nozzle connected to a lower portion of the melting chamber and dropping the melt; and a press for pressing the melt to have a predetermined shape in a state where the melt is being solidified after being dropped onto the workpiece.

It is preferred that the melting chamber or the injection nozzle be provided with a heater to prevent solidification of the melt.

In addition, the press may be directly connected to a lower portion of the melting chamber. In this case, the press should be longer than the injection nozzle, and the apparatus further comprises a drive means for moving the melting chamber upward and downward.

Further, the press may be coupled to a lower portion of an elevation plate, which is provided separately from the melting chamber and moved upward and downward. In this case, it is preferred that the elevation plate be located below the melting chamber and a through-hole which the injection nozzle penetrates is formed in the elevation plate.

Furthermore, it is preferred that a recess be formed on the workpiece at a position where the melt is dropped in order to align such a position and to allow the dropped melt to be positioned in place.

Accordance to another aspect of the present invention, there is provided a method of forming an embossed portion on a workpiece, comprising the steps of (1) dropping melt to be a material of the embossed portion on the workpiece; and (2) pressing the dropped melt by means of a press to have a predetermined shape, thereby forming the embossed portion. After step (2), the method may comprise the step of polishing a surface of the embossed portion or coating the surface thereof with insulation.

Particularly, in step (2), it is preferable that the melt is pressed by lowering the press at ½ to ⅓ of the height of the dropped melt.

DESCRIPTION OF THE PREFERRED EMBODIMENT

Hereinafter, an embossing apparatus and method according to the present invention will be described with reference to the accompanying drawings.

Figure 1A:
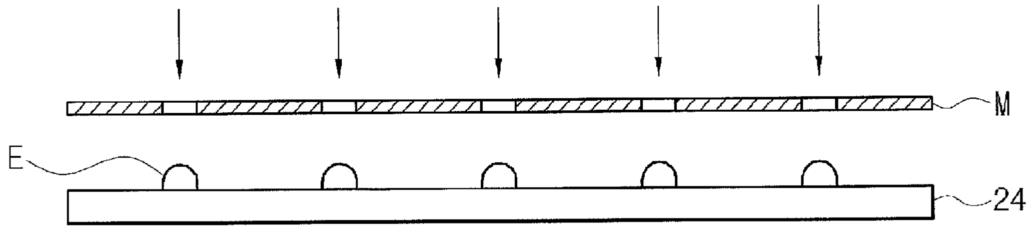
FIG. 1*a* is a view schematically illustrating a conventional embossing method.
Figure 1B:
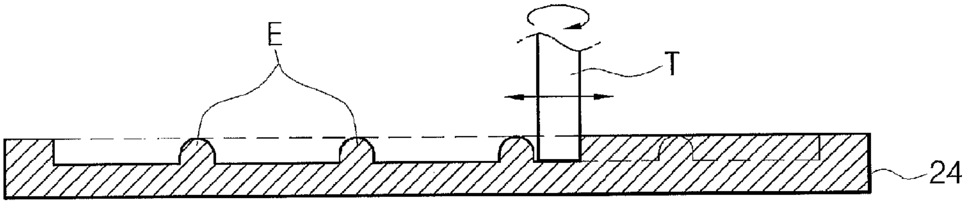
FIG. 1*b* is a view schematically illustrating another conventional embossing method.
Figure 2:
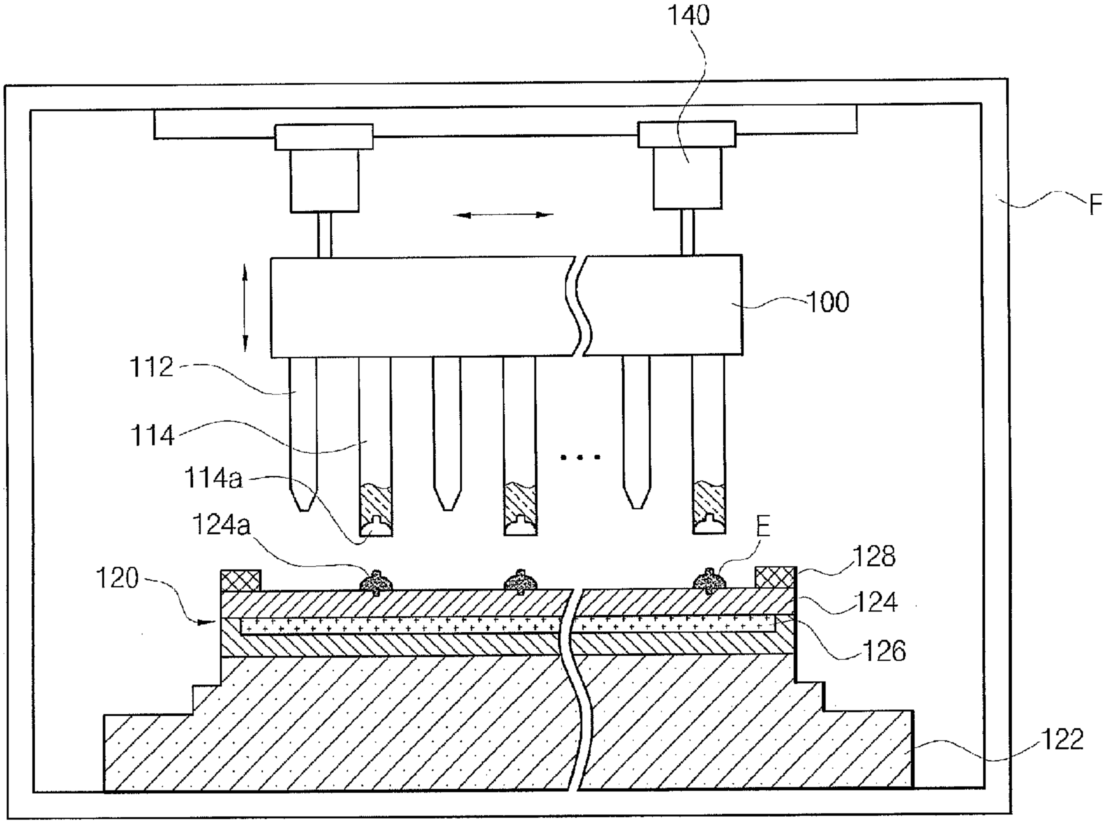
FIG. 2 is a view showing an embossing apparatus according to an embodiment of the present invention.

As shown in FIG. 2, an embossing apparatus according to a preferred embodiment of the present invention includes a melting chamber 100, a plurality of injection nozzles 112, and a plurality of presses 114. Meanwhile, a workpiece 120 to be formed with embossed portions E is a substrate support for supporting a substrate or an electrostatic chuck for fixing a substrate using an electrostatic force. The workpiece 120 includes a lower base 122, a lower insulation layer 126, and an upper insulation layer 124. The embossed portions E are formed on an upper surface of the upper insulation layer 124. A cooling passage is formed in the lower base 122, and a dam portion 128 is formed on an edge of the upper insulation layer 124.

The melting chamber 100 is provided above the workpiece 120 and is filled with ceramic such as alumina ($Al_2O_3$) which is a material of the embossed portions E, and the ceramic is heated. The material is supplied in the form of powder and is melted. The plurality of injection nozzles 112 which are supplied with the melt and drop it onto the workpiece 120 are provided on a lower portion of the melting chamber 100. The injection nozzle 112 is a structure capable of controlling an amount of the melt.

It is preferable that heaters (not shown) be provided in the melting chamber 100 and the injection nozzles 112 in order to prevent the melt from being solidified.

In this embodiment, the presses 114 are connected to the lower portion of the melting chamber 100.

Each of the presses 114 is in the shape of a bar, and a recess 114*a* with a predetermined shape corresponding to the embossed portion E is formed in a lower end of the press 114. The press 114 is detachably connected to the melting chamber 100 and can be exchanged depending on the size and shape of the embossed portion E.

The melting chamber 100 can be horizontally moved from side to side along a frame F and also be moved upward and downward by a drive means 140. The reason why the melting chamber 100 is moved upward and downward is that the press 114 can press the melt which has dropped onto the workpiece 120 and has been solidified.

That is, after the injection nozzle 112 drops the melt and a predetermined period of time elapses in order for the melt to be solidified in a state suitable for forming the embossed portion E, the drive means 140 lowers the press 114. Due to the structure, the press 114 should be formed to be inevitably longer than the injection nozzle 112.

Although not shown, as the drive means 140, a pneumatic or hydraulic cylinder is used, or a drive motor and a screw are used to provide power by converting the rotational force of the drive motor to a linear reciprocation through the screw. In addition, the drive means 140 can be variously associated with what is vertically reciprocated or converts a rotational movement to a linear reciprocation.

Figure 3:
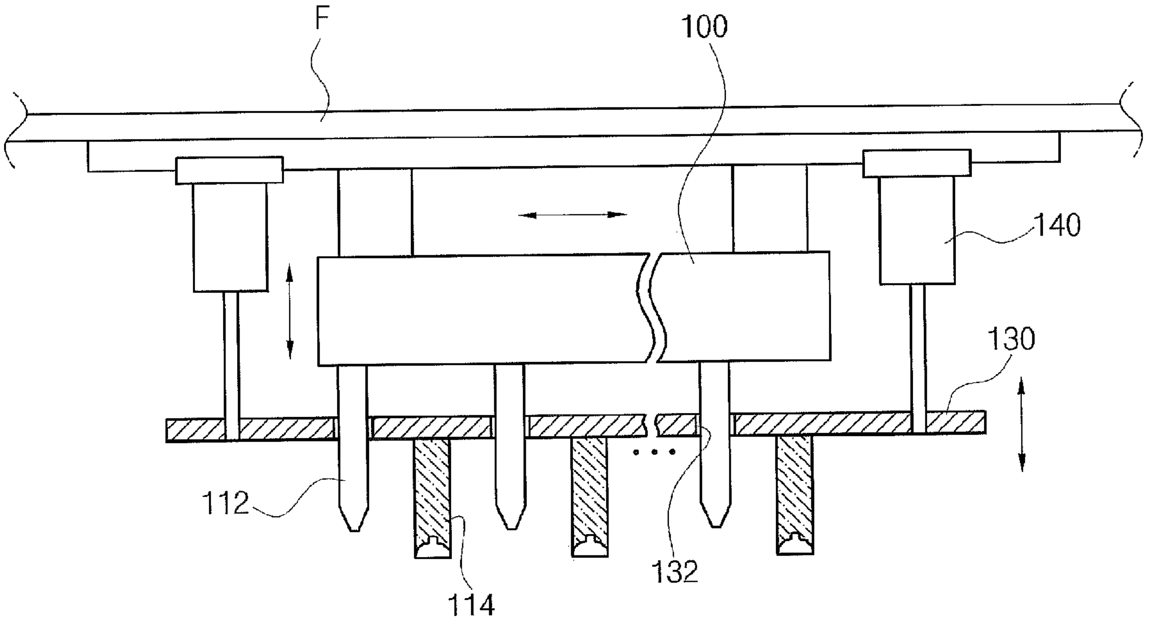
FIG. 3 is a view showing an embossing apparatus according to another embodiment of the present invention.

FIG. 3 shows another embodiment of the embossing apparatus according to the present invention. It can be understood with reference to FIG. 3 that the plurality of presses 114 are directly connected to a lower portion of an elevation plate 130 instead of the melting chamber 100. That is, the elevation plate 130 vertically moved by the drive means 140 is located below the melting chamber 100, and through-holes 132 are formed in the elevation plate 130 so that the injection nozzles 112 can penetrate the elevation plate 130.

Therefore, after the melt is dropped through the injection nozzles 112, only the elevation plate 130 and the presses 114 are lowered, with the melting chamber 100 and the injection nozzles 112 being fixed. Further, the melting chamber 100 and the injection nozzles 112 may also be independently moved vertically and horizontally, if necessary. The other configurations are the same as those of the embodiment illustrated in FIG. 2.

Hereinafter, the operation of the embossing apparatus illustrated in FIG. 2 will be described with reference to FIGS. 4*a* to 4*d*.

Figure 4A:
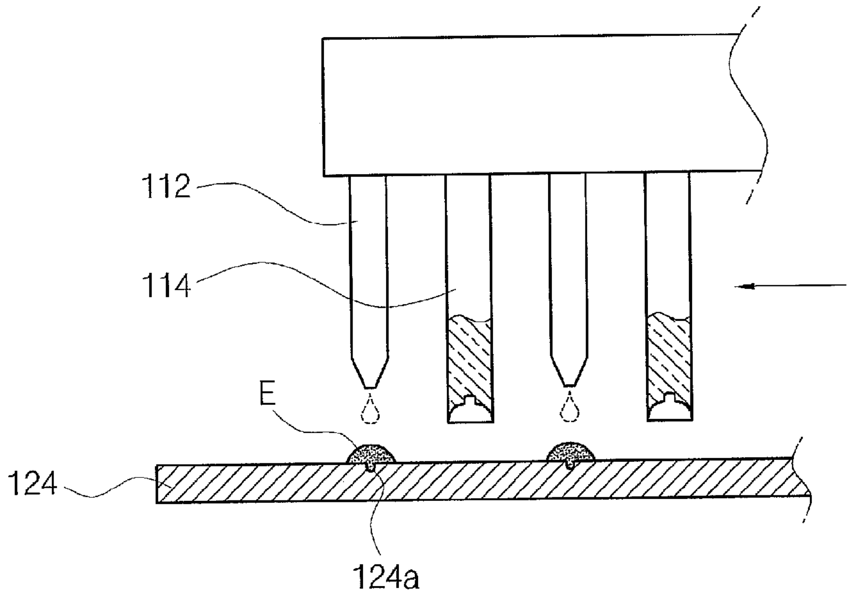
FIGS. 4*a* to 4*d* show operation states of the embossing apparatus shown in FIG. 2.

First, as shown in FIG. 4*a*, a predetermined amount of the melt filled in the melting chamber 100 is dropped onto the workpiece, more specifically, onto the upper insulation layer 124. At this time, recesses 124*a* are formed on the upper surface of the workpiece at positions where the embossed portions E will be formed, and thus, help the dropped melt to be located in places. Further, the recesses 124*a* can serve to easily confirm the positions where the melt is dropped.

Figure 4B:
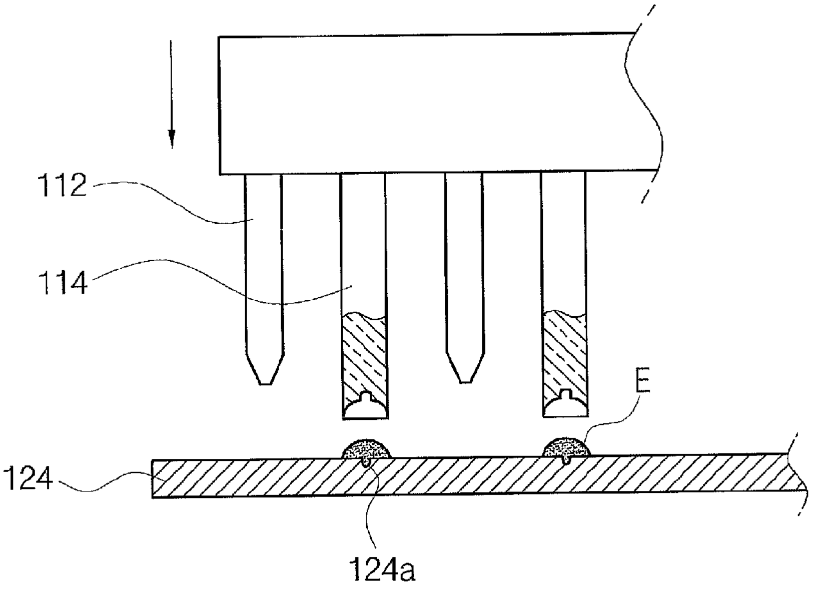

Next, as shown in FIG. 4*b*, after the presses 114 are horizontally moved from side to side so as to be located above the dropped melt, the melting chamber is lowered by the drive means. Accordingly, even though the injection nozzles 112 are lowered as well as the presses 114, the injection nozzles 112 do not interfere with forming the embossed portions E since the presses 114 are longer than the injection nozzles 112.

Figure 4C:
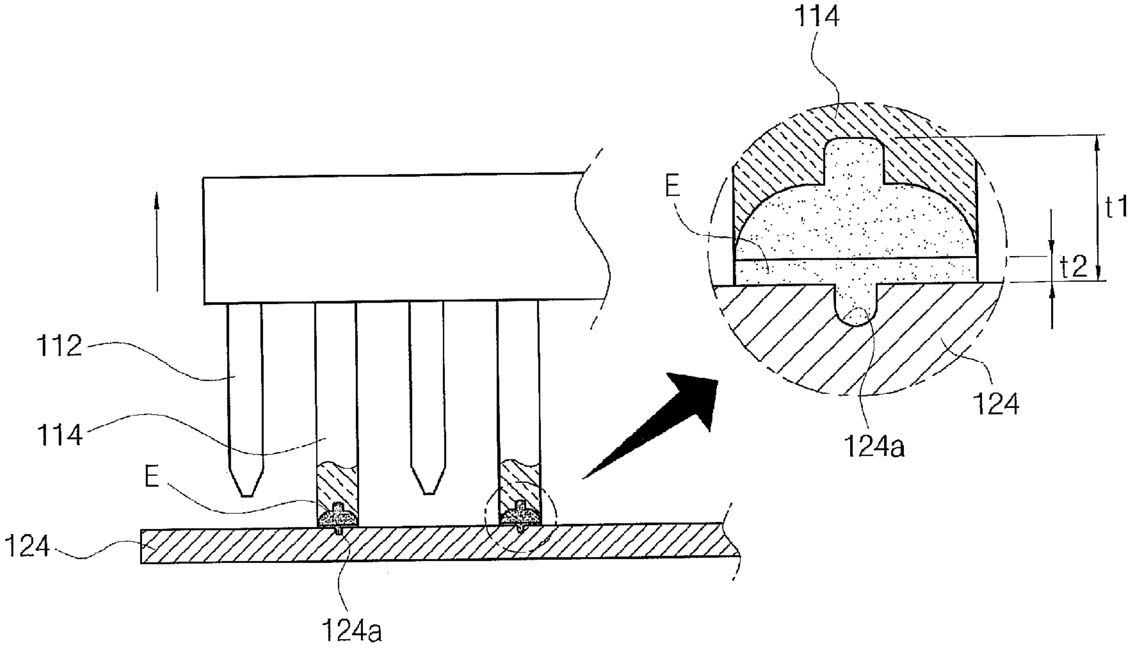

Referring to FIG. 4*c*, when the presses 114 are lowered and press the melt, a lowered position t2 of the presses 114 is in a range from ½ to ⅓ of a height t1 of the embossed portions to be formed. This is the reason why the forming defect of the embossed portions E occurs if the presses 114 are lowered up to a position higher than ½ of the height t1 of the embossed portions, and the presses 114 may damage the upper insulation layer 124 if the presses 114 are lowered to a position lower than ⅓ of the height t1 of the embossed portions.

Figure 4D:
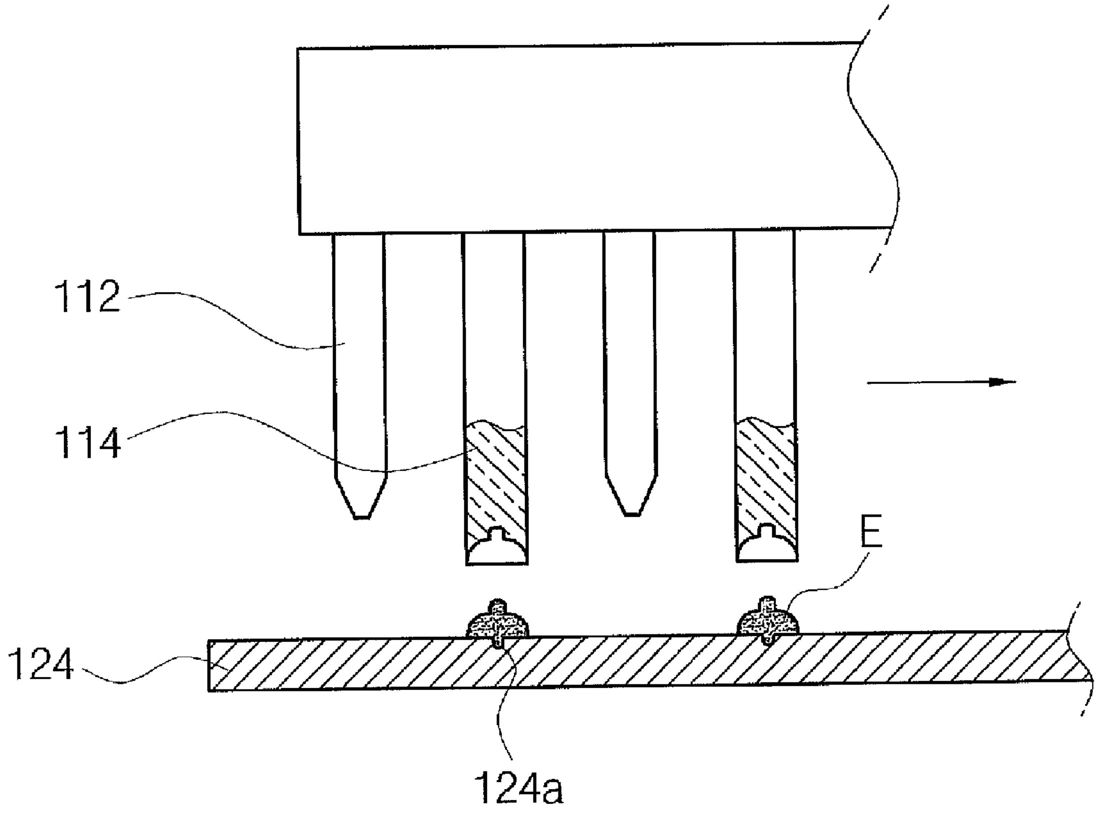

Finally, if the embossed portions E are completely formed, as shown in FIG. 4*d*, the presses 114 are moved upward again using the drive means. If the embossed portions are formed on the entire workpiece through such an operation, the process is completed. However, if the embossed portions are partially formed on the workpiece, the melting chamber is horizontally moved from side to side along the frame and embossed portions are formed on another section of the workpiece through the same operation.

Figure 5:
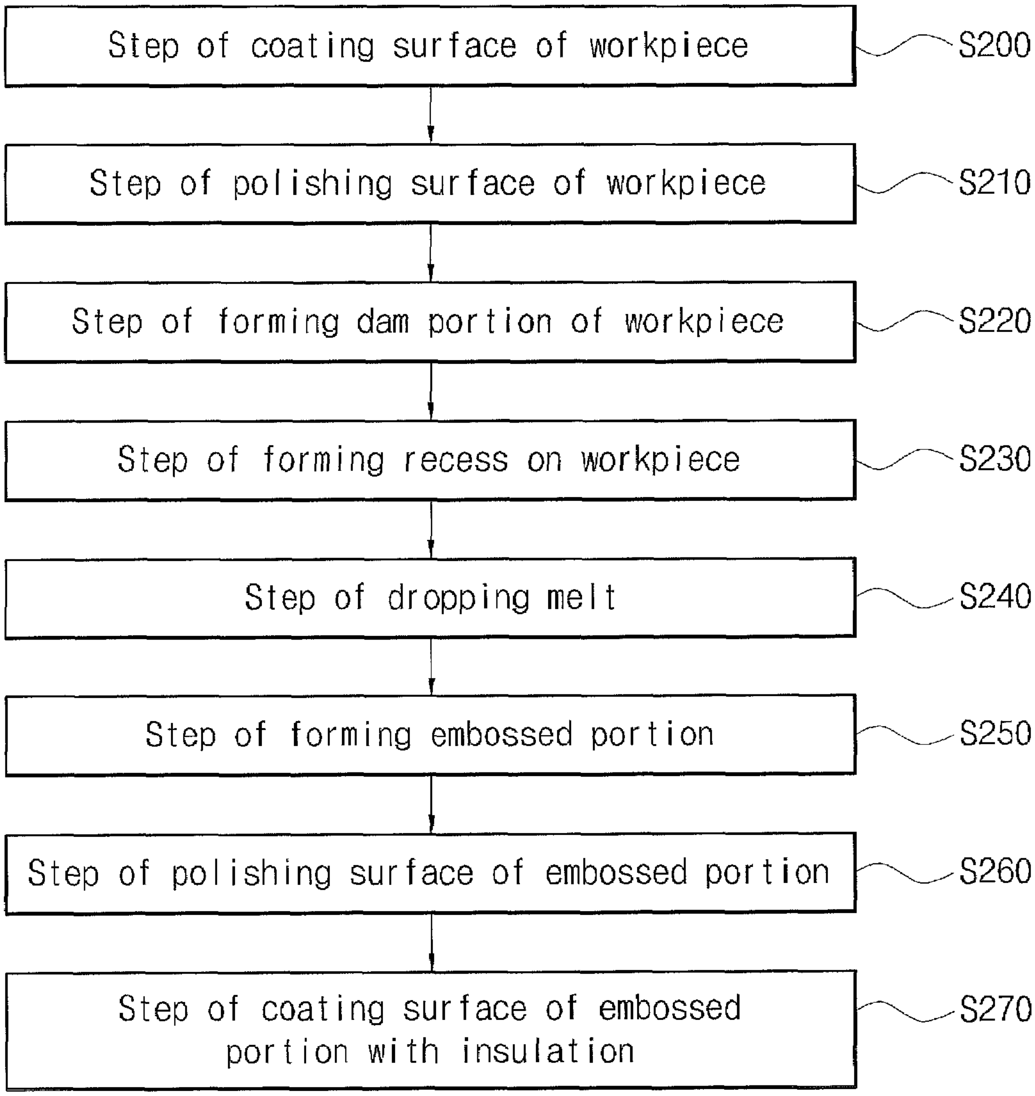
FIG. 5 is a flowchart illustrating an embossing method according to the present invention.

An embossing method according to the present invention will be described with reference to FIG. 5. As shown in the figure, the embossing method includes the steps of coating a surface of a workpiece (step S200), polishing the surface of the workpiece (step S210), forming the dam portion of the workpiece (step S220), forming the recesses on the upper surface of the workpiece (step S230), dropping melt (step S240), forming embossed portions (step S250), polishing a surface of the embossed portions (step S260), and coating the surface of the embossed portions with insulation (step S270).

Step S200 of coating the surface of the workpiece is a step of forming a coating layer on a surface of the upper insulation layer 124 before forming the embossed portions.

Step S210 of polishing the surface of the workpiece is a step of polishing the surface of the upper insulation layer 124 after coating the surface of the insulation layer 124.

Step S220 of forming the dam portion of the workpiece is a step of forming the dam portion on the edge of the upper insulation layer 124 in a method different from forming the embossed portions. An additionally provided dam portion is bonded to the edge of the upper insulation layer 124. That is, the preformed dam portion is attached to the peripheral portion of the upper insulation layer 124.

Step S230 of forming the recesses on the upper surface of the workpiece is a step of forming the recesses with an appropriate depth at the positions where the embossed portions E will be formed on the surface of the upper insulation layer 124. At this time, the recesses may be machined with a drill or the like and may be formed when the upper insulation layer 124 is formed.

Step S240 of dropping the melt is a step of dropping the melt filled in the melting chamber 100 at the positions where the recesses are formed, wherein an amount of the dropped melt is controlled according to the size of the embossed portions to be formed.

In the forming embossed portions step S250, if the melt dropped onto the upper insulation layer 124 is solidified to some extent, the embossed portions E are formed to have a predetermined shape using the presses.

Step S260 of polishing the surface of the embossed portions is a step of polishing the surface of the embossed portions E to control the roughness thereof if the embossed portions E are formed. Although various polishing methods may be employed, it is preferable that a sanding polishing method be applied.

Step S270 of coating the surface of the embossed portions with the insulation is a step of forming the insulation layer on the surface of the upper insulation layer 124 having the embossed portions E provided thereon. According to the present invention, embossed portions can be simply and easily formed by dropping, solidifying and pressing melt to have a predetermined shape.

Further, the uniformity in size and shape of embossed portions can be secured.

What is claimed is:

1. An apparatus for forming a plurality of embossed portions on a workpiece, the apparatus comprising:

a melting chamber filled with melt;

a plurality of injection nozzles provided at a lower portion of the melting chamber, wherein the plurality of injection nozzles drops the melt onto the workpiece; and a plurality of presses disposed adjacent to each of the plurality of injection nozzles, respectively, wherein the plurality of presses the dropped melt into a predestined shape of the plurality or embossed portions while the dropped melt is solidifying;

wherein the plurality of presses is provided at the lower portion of the melting chamber, and wherein the plurality of presses is longer than the plurality of injection nozzles.

2. The apparatus as claimed in claim 1, wherein at least one of the melting chamber and the plurality of injection nozzles is provided with a heater.

3. The apparatus as claimed in claim 1, wherein the plurality of injection nozzles includes a structure that controls an amount of the melt.

4. The apparatus as claimed in claim 1, further comprising a drive device that moves the melting chamber in a vertical direction.

5. The apparatus as claimed in claim 4, wherein the drive device moves the melting chamber in a horizontal direction.

6. The apparatus as claimed in claim 1, wherein the melt comprises a ceramic.

7. The apparatus as claimed in claim 1, wherein the plurality of injection nozzles drops the melt at a portion on the workpiece based on a plurality of recesses provided on the workpiece corresponding to the plurality of embossed portions.

8. The apparatus as claimed in claim 1, wherein the plurality of presses are each in the shape of a bar.

9. The apparatus as claimed in claim 8, wherein each of the plurality of presses comprises a recess at a lower end thereof corresponding to the predetermined shape of the plurality of embossed portions.

10. An apparatus for forming a plurality of embossed portions on a workpiece, the apparatus comprising:

a melting chamber filled with melt;

a plurality of injection nozzles provided at a lower portion of the melting chamber, wherein the plurality of injection nozzles drops the melt onto the workpiece; and a plurality of presses disposed adjacent to each of the plurality of injection nozzles, respectively, wherein the plurality of presses the dropped melt into a predestined shape of the plurality or embossed portions while the dropped melt is solidifying;

wherein the plurality of presses is provided at a lower portion of an elevation plate, wherein the elevation plate is provided separately from the melting chamber.

11. The apparatus as claimed in claim 10, wherein the elevation plate is provided below the melting chamber and includes a plurality of through-holes corresponding to each of the plurality of injection nozzles so that each of the plurality of injection nozzles penetrates through the elevation plate.

12. The apparatus as claimed in claim 10, further comprising a drive device that moves independently the melting chamber along with the plurality of injection nozzles and the elevation plate along with the plurality of presses in a vertical direction.

13. The apparatus as claimed in claim 12, wherein the drive device moves independently the melting chamber along with the plurality of injection nozzles and the elevation plate along with the plurality of presses in a horizontal direction.

14. An apparatus for forming at least one embossed portions on a workpiece, the apparatus comprising:

a melting chamber filled with melt;

at least one injection nozzle provided at a lower portion of the melting chamber, configured to drop melt onto the workpiece;

at least one press disposed adjacent to each of the at least one injection nozzle and configured to press the dropped melt into a predestined shape of the at least one embossed portions while the dropped melt is solidifying; and a drive device configured to move the at least one injection nozzle and the at least one press in a vertical direction;

wherein the plurality of presses is provided at the lower portion of the melting chamber, and wherein the plurality of presses is longer than the plurality of injection nozzles.

15. The apparatus claimed in claim 14, wherein the drive device is configured to move the at least one injection nozzle and the at least one press in a horizontal direction.

16. The apparatus as claimed in claim 14, wherein the drive device is configured to independently move the at least one injection nozzle and the at least one press in the vertical direction.

17. The apparatus as claimed in claim 14, wherein the at least one press is longer than the at least one injection nozzle.

18. The apparatus as claimed in claim 14, wherein the melt comprises a ceramic.

* * * * *